United States Patent

Lucas

[15] 3,649,924

[45] Mar. 14, 1972

[54] SAMPLING AMPLIFIER

[72] Inventor: Paul G. Lucas, Sudbury, Mass.

[73] Assignee: Gordon Engineering Company, Wakefield, Mass.

[22] Filed: Mar. 2, 1970

[21] Appl. No.: 15,690

[52] U.S. Cl. .......... 330/9, 330/86

[51] Int. Cl. .......... H03f 1/02

[58] Field of Search .......... 330/9–11, 29, 86, 330/110

[56] References Cited

UNITED STATES PATENTS

| | | | |
|---|---|---|---|
| 3,139,590 | 6/1964 | Brown | 330/9 |
| 3,237,116 | 2/1966 | Skinner et al. | 330/9 |
| 3,458,821 | 7/1969 | Clarridge | 330/86 UX |

FOREIGN PATENTS OR APPLICATIONS

| | | | |
|---|---|---|---|
| 849,244 | 9/1960 | Great Britain | 330/9 |

*Primary Examiner*—Robert Segal
*Assistant Examiner*—James B. Mullins
*Attorney*—Morse, Altman & Oates

[57] ABSTRACT

An output signal from a sampling system employing an operational amplifier is independent of the offset voltage of the amplifier. A voltage as at the input terminal of a first switch and a ground as at the input terminal of a second switch are applied selectively to the operational amplifier, the output terminal of each of the switches being connected to the noninverting input of the operational amplifier. The gain of the amplifier is governed by a digitally controlled impedance network which is connected as a feedback loop between the output terminal of the amplifier and has inverting input. A capacitor is connected serially between the output terminal of the amplifier and the input terminal of a third switch, the output terminal of the third switch is connected to ground. The first, second and third switches are responsive to signals from a control, the second and third switches having like states and the first switch having a state opposite that of the second and third switches.

6 Claims, 1 Drawing Figure

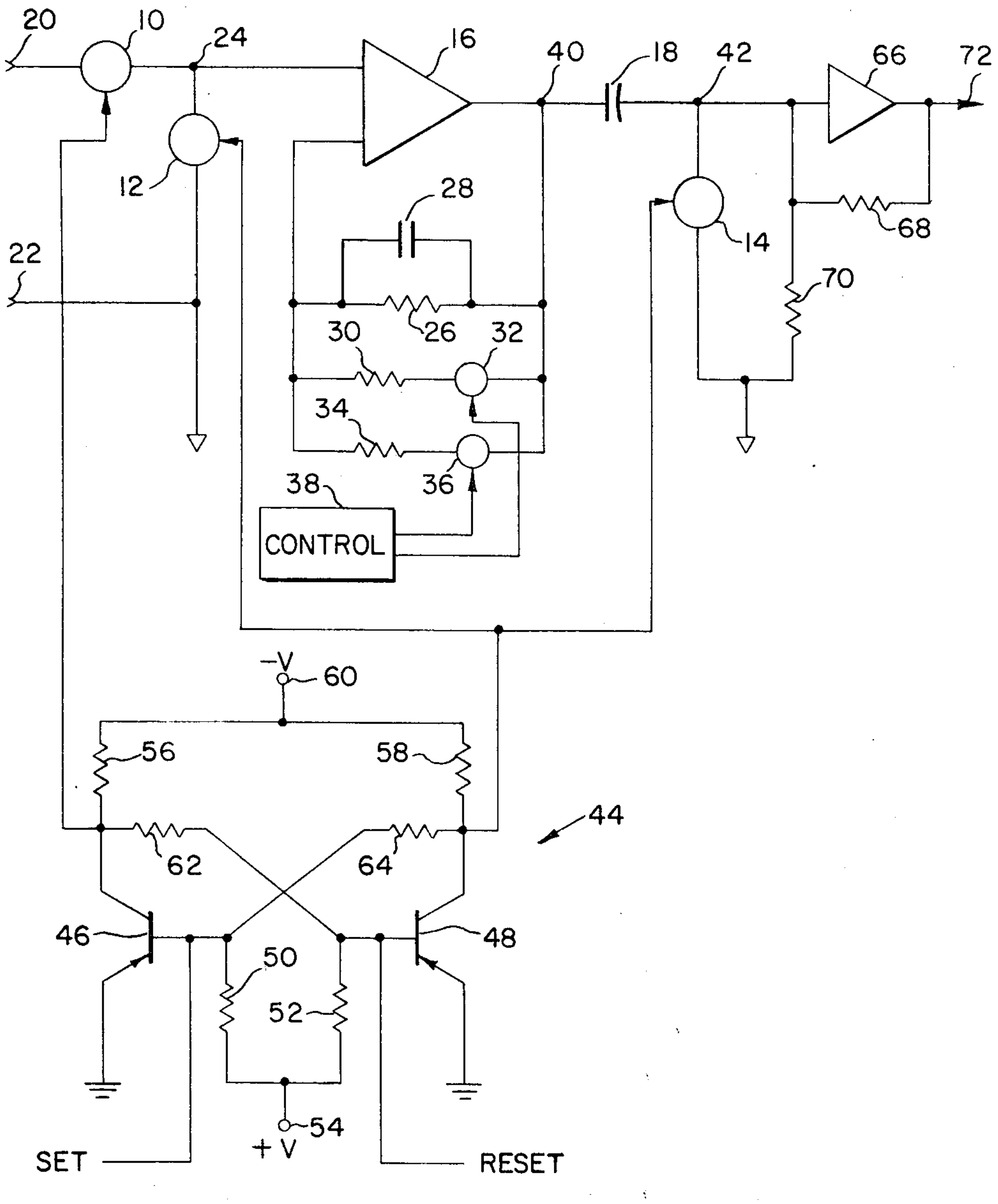
INVENTOR
PAUL G. LUCAS
BY Morse, Altman & Oates
ATTORNEYS

SAMPLING AMPLIFIER

BACKGROUND OF THE INVENTION

1. Field of the Invention

This invention relates to sampling of electrical signals and, more particularly, to digitally controlled sampling amplifier systems.

2. Description of the Prior Art

Various types of sampling techniques have been proposed, including those employing operational amplifiers. Due to the inherent characteristic of an operational amplifier, the signal at its output includes an offset voltage which represents an error. The variety of networks which have been designed to compensate for this error are unduly complex and expensive.

SUMMARY OF THE INVENTION

An object of the present invention is to provide a simple, inexpensive and fast acting sampling system which is characterized by first and second digitally controlled switches for applying selectively a signal to the noninverting input of an operational amplifier, the gain of the amplifier being specified by a digitally controlled feedback loop, and a capacitor connected serially between the output of the amplifier and the input of a third digitally controlled switch. The second and third switches are in an open state when the first switch is in a closed state and the second and third switches are in the closed state when the first switch is in an open state. The combination of digitally controlled switches, operational amplifier and capacitor is such as to provide a simple inexpensive and fast acting sampling system.

The invention accordingly comprises the sampling system possessing the combination of elements and arrangements of parts that are exemplified in the following disclosure, the scope of which will be indicated in the appended claims.

BRIEF DESCRIPTION OF DRAWINGS

For a fuller understanding of the nature and objects of the present invention, reference should be had to the following detailed description of the preferred embodiment depicted in the accompanying drawings wherein FIGURE 1 is a schematic of a sampling amplifier system embodying the present invention.

DETAILED DESCRIPTION OF THE PREFERRED EMBODIMENT

Generally, the system is comprised of switches 10, 12, 14, an amplifier 16 and a capacitor 18. The input of each of switches 10 and 12 are connected to terminals 20 and 22, respectively, and the output of each of switches 10 and 12 are joined at a common junction 24. The noninverting input of amplifier 16 is connected to junction 24. A resistor 26 and a capacitor 28 in parallel therewith is connected as a feedback loop between the output and inverting input of amplifier 16. A resistor 30 in series with a switch 32 and a resistor 34 in series with a switch 36 are connected in parallel with resistor 28, each of the resistor-switch circuits being in parallel with one another. The gain of amplifier 16 is governed by the energizing and deenergizing of each of switches 32 and 36 in response to signals as at the output of a control 38. Preferably, the output of control 38 is in the form of digital signals. Capacitor 18 is connected serially between the output of amplifier and the input of switch 14, the junction of capacitor 18 and the output of amplifier 16 and the junction of capacitor 18 and the input of switch 14 being designated as 40 and 42, respectively. The energizing and deenergizing of each of switches 10, 12 and 14 are governed by signals from a control 44, switches 12 and 14 being energized when switch 10 is deenergized and vice versa.

In the illustrated embodiment, control 44 is a flip-flop which includes a pair of transistors 46, 48 having mutually exclusive conduction states. The base of transistor 46 and the base of transistor 48 are connected through resistors 50 and 52, respectively, to a terminal 54 at which a positive voltage is applied. The emitter of each of the transistors is directly coupled to ground. The collector of transistor 46 and the collector of transistor 48 are connected through resistors 56 and 58, respectively, to a terminal 60 at which a negative voltage is applied. Positive feedback from the collector of transistor 46 to the base of transistor 48 and from the collector of transistor 48 to the base of transistor 46 is provided through resistors 62 and 64, respectively.

In the following discussion of the operation of control 44, it is assumed that transistor 48 is conducting and transistor 46 is cut off. The collector of 48 will be close to ground potential, while the collector of 46 will be at a negative potential. A positive potential is maintained at the base of transistor 46 by the voltage divider action of resistor 50 and 64, thus transistor 46 remains cut off. The signal as at the collectors of transistor 46 and 48 will be designated ZERO and ONE, respectively, ONE denoting conduction and ZERO denoting cut off. A negative pulse is applied to the base of transistor 46, in consequence transistor 46 is brought out of cut off. As transistor 46 begins to conduct, the current through resistor 56 increases and the base of transistor 48 becomes less negative by the voltage-divider action of resistors 56, 62 and 52, in consequence the current through transistor 48 decreases. When the collector of 48 approaches ground potential, the base of transistor 48 will be held at a positive voltage by resistor 62 and 52 with respect to its emitter. Now, transistor 48 is cut off and transistor 46 is conducting, the collector of transistor 48 being ZERO and the collector of transistor 46 being ONE. It will be readily appreciated that, if a negative signal is applied now to the base of transistor 48, transistor 48 will conduct and transistor 46 will be cut off. The signal as at the collector of transistor 46 is applied to switch 10 and the signal as at the collector of transistor 48 is applied to switches 12 and 14 for control thereof.

In the illustrated embodiment, junction 42 is connected to the high input impedance of an amplifier 66, the gain of which is governed by the voltage-divider feedback loop of resistors 68 and 70.

CIRCUIT OPERATION

In the following exemplary discussion of the operation of the sampling system, switches 10, 12, and 14 are in the energized state or closed when a ONE is applied thereto and in the deenergized state or opened when a ZERO is applied thereto. Initially, transistor 48 is conducting and transistor 46 is cut off, in consequence switch 10 is opened and switches 12 and 14 are closed. The signal as at terminal 22, for example ground potential, is applied to the noninverting input of amplifier 16 via closed switch 12. The output $E_1$ of amplifier 16 is given by the expression:

$$E_1=G\epsilon$$

where $G$ is the gain of amplifier 16 and $\epsilon$ is the offset voltage of amplifier 16.

Since junction 42 is connected to ground through closed switch 14 capacitor 18 is charged to the valve $E_1$.

A negative pulse is applied to the base of transistor 46, in consequence transistor 46 conducts and transistor 48 is cut off. The signal as at terminal 20, for example a voltage $E_2$, is applied to the noninverting input of amplifier 16 via closed switch 10. The output $E_3$ of amplifier 16 is given by the expression:

$$E_3=GE_2+G\epsilon$$

As previously stated, junction 42 is connected to the high input impedance of amplifier 66, in consequence the amplifier gain times the offset voltage, remains stored on capacitor 18. Accordingly, the voltage as at junction 42 is $GE_2$ which is the signal as at terminal 22 times the gain of amplifier 16. It is to be noted that the voltage as at junction 42 is free of the offset voltage of amplifier 16. In the illustrated embodiment, the voltage as at junction 42 is applied to an output terminal 72 via amplifier 66.

Since certain changes may be made in the foregoing disclosure without departing from the scope of the invention herein involved, it is intended that all matter contained in the above description and shown in the accompanying drawings be construed in an illustrative and not in a limiting sense.

What is claimed is:

1. A sampling system comprising:

a. a first amplifier having first and second input terminals and an output terminal;

b. first switch means having input, output, and control terminals, said output terminal of said first switch means electrically connected to said first input terminal of said first amplifier, a first signal being applied at said input terminal of said first switch means;

c. second switch means having input, output, and control terminals, said output terminals of said second switch means electrically connected to said output terminal of said first switch means and said first input terminal of said first amplifier, a second signal being received at said input terminal of said second switch means;

d. third switch means having input, output, and control terminals;

e. a first capacitor connected serially between said output terminal of said first amplifier and said input terminal of said third switch means, said output terminal of said third switch means being connected to a ground potential;

f. feedback means electrically connected between said output terminal and second input terminal of said first amplifier, said feedback means including a second capacitor and a first resistor, said second capacitor connected in parallel with said first resistor; and g. control means electrically connected to said control terminals of said first, second, and third switch means for selectively energizing and deenergizing each said switch means, said second and third switch means being energized when said first switch means is deenergized, said first switch means being energized when said second and third switch means are deenergized;

h. said first capacitor being charged to the offset voltage of said first amplifier times the gain of said first amplifier when said second and third switch means are energized, a voltage at said input terminal of said third switch means being said first signal times the gain of said first amplifier when said first switch means is energized, said first amplifier operating in a closed loop mode at all times.

2. The sampling system as claimed in claim 1 wherein said control means is a flip-flop.

3. The sampling system as claimed in claim 1 wherein said feedback means also includes:

a. a second resistor connected between said output terminal and said second input terminal of said first amplifier;

b. fourth switch means having input, output, and control terminals, said second resistor and fourth switch means being connected serially between said output terminal and said second input terminal of said first amplifier in parallel with said first resistor and said second capacitor; and c. means electrically connected to said fourth switch means for selectively energizing said fourth switch means for controlling the gain of said first amplifier.

4. The sampling system as claimed in claim 3 including a second amplifier having input and output terminals, said input terminal of said second amplifier connected to said input terminal of said third switch means, said amplifier presenting a high impedance to said first capacitor.

5. A sampling system comprising:

a. a first amplifier having first and second input terminals and an output terminal;

b. first switch means having input, output, and control terminals, said output terminal of said first switch means electrically connected to said first input terminal of said first amplifier, a first signal being applied at said input terminal of said first switch means;

c. second switch means having input, output, and control terminals, said output terminal of said second switch means electrically connected to said output terminal of said first switch means and said first input terminal of said first amplifier, a second signal being received at said input terminal of said second switch means;

d. third switch means having input, output, and control terminals;

e. a first capacitor connected serially between said output terminal of said first amplifier and said input terminal of said third switch means, said output terminal of said third switch means being connected to a ground potential;

f. closed-loop feedback means electrically connected between said output terminal and second input terminal of said first amplifier, said closed-loop feedback means including a second capacitor and a first resistor, said second capacitor connected in parallel with said first resistor;

g. a second amplifier having input and output terminals, said input terminal of said second amplifier connected to said input terminal of said third switch means, said second amplifier presenting a high impedance to said first capacitor; and h. control means electrically connected to said control terminals of said first, second, and third switch means for selectively energizing and deenergizing each said switch means, said second and third switch means being energized when said first switch means is deenergized, said first switch means being energized when said second and third switch means are deenergized;

i. said first capacitor being charged to the offset voltage of said first amplifier times the gain of said first amplifier when said second and third switch means are energized, a voltage at said input terminal of said third switch means being said first signal times the gain of said first amplifier when said first switch means is energized, said first amplifier operating in a closed loop mode at all times.

6. The sampling system as claimed in claim 5 wherein said closed-loop feedback means also includes:

a. a second resistor;

b. fourth switch means, said second resistor and fourth switch means being connected serially between said second input and output terminals of said first amplifier, said fourth switch means and second resistor connected in parallel with said second capacitor and first resistor;

c. a third resistor;

d. fifth switch means, said third resistor and fifth switch means being connected serially between said second input and output terminals of said first amplifier, said third resistor and fifth switch means connected in parallel with said second resistor and fourth switch means; and e. digital control means electrically connected to said fourth and fifth switch means for selectively energizing said fourth and fifth switch means for controlling the gain of said first amplifier.

* * * * *